United States Patent [19]

Iwasaki

[11] Patent Number: 4,941,150
[45] Date of Patent: Jul. 10, 1990

[54] SPREAD SPECTRUM COMMUNICATION SYSTEM

[75] Inventor: Yoshiki Iwasaki, Yokohama, Japan

[73] Assignee: Victor Company of Japan, Ltd., Kanagawa, Japan

[21] Appl. No.: 190,525

[22] Filed: May 5, 1988

[30] Foreign Application Priority Data

May 6, 1987 [JP] Japan .................. 62-110135

[51] Int. Cl.⁵ .............................. H04K 1/10
[52] U.S. Cl. ........................... 375/1; 380/34; 380/48
[58] Field of Search .............. 375/1; 380/34, 48

[56] References Cited

U.S. PATENT DOCUMENTS

| | | | |
|---|---|---|---|
| 4,045,796 | 8/1977 | Kline, Jr. .................. | 375/1 |
| 4,327,438 | 4/1982 | Baier et al. ............... | 371/1 |
| 4,447,907 | 5/1984 | Bjopnholt et al. ........ | 375/1 |
| 4,532,635 | 7/1985 | Mangulis ................... | 375/1 |
| 4,532,636 | 7/1985 | Wilkinson ................. | 375/1 |
| 4,543,657 | 9/1985 | Wilkinson ................. | 375/1 |
| 4,649,549 | 3/1987 | Halpern et al. .......... | 375/1 |
| 4,829,540 | 5/1989 | Waggener, Sr. et al. .. | 375/1 |

OTHER PUBLICATIONS

The Radio Amateur's Handbook (1973), Standard Frequencies and Time Signals, Myers Ed.

Primary Examiner—Salvatore Cangialosi
Attorney, Agent, or Firm—Michael N. Meller

[57] ABSTRACT

A spread spectrum communication system has, in a transmission part, a first circuit for extracting a first carrier signal from a predetermined broadcase wave and generating a first clock signal by using the first carrier signal, a second circuit for generating a first pseudo-noise signal by using the first clock signal from the first circuit, and a third circuit for modulating an information signal and broadening a frequency band of the modulated information signal by using the first pseudo-noise signal from the second circuit. A reception part of the spread spectrum communication system uses a second clock signal, a frequency of which is identical to that of the first clock signal. Thereby the second clock signal becomes identical to the first clock signal in frequency.

28 Claims, 5 Drawing Sheets

SPREAD SPECTRUM COMMUNICATION SYSTEM

BACKGROUND OF THE INVENTION

The present invention generally relates to spread spectrum communication systems, and in particular to spread spectrum communication systems which can be used for a wireless microphone, a paging system, a transceiver, a remote control system and so on.

In a spread spectrum communication system, a pseudo-noise (hereafter simply referred to as PN) signal which is a sequential noise-like signal is used for spreading a spectrum to broaden the frequency band of a transmission signal by using a signal other than an information signal to be sent, and for narrowing the spectrum (despread) to obtain the original transmission signal from the band-broadened signal. In this case, a need exists such that a PN signal used in a reception part must have the same pattern as and must be synchronized with a PN signal used in a transmission part. In order to satisfy this requirement, it is necessary to supply clock signal synchronized with each other to the transmission and reception parts and to therefore generate PN signals which have the same pattern and are in synchronization with each other.

Figure 1:
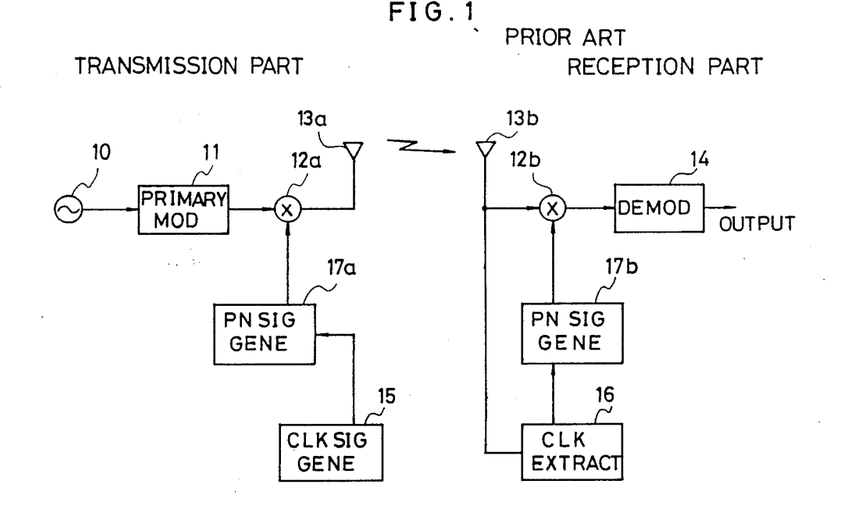
FIG. 1 is a block diagram of an example of conventional spread spectrum communication systems.

Referring to FIG. 1 which shows an example of a conventional spread spectrum communication system, a signal derived from a signal source 10 in a transmission part is modulated by a primary modulator 11 and is supplied to one of inputs of a multiplier 12a. The other input of the multiplier 12a is supplied with a PN signal generated by a PN signal generator 17a. Both the input signals of the multiplier 12a are multiplied. A multiplied result which corresponds to a spread transmission signal is supplied to an antenna 13a. The transmitted signal is passed through an antenna 13b in a reception part and is supplied to one of inputs of a multiplier 12b and a clock signal extracting circuit 16. The other input of the multiplier 12b is supplied with a PN signal generated by a PN signal generator 17b. The received signal is subjected to the despreading process by the multiplier 12b. The despread signal is supplied to a demodulator 14, and is demodulated thereby. The demodulator 14 generates the demodulated transmission signal.

In the above operation, the PN signal generated by the PN signal generator 17a must have the same pattern as and must be synchronized with the PN signal generated by the PN signal generator 17b. To meet this requirement, the PN signal generator 17a in the transmission part is provided with a clock signal generated by a clock signal generator 15, and in the reception part, the clock signal is extracted from the received signal by a clock signal extracting circuit 16, and the extracted clock signal is supplied to the PN signal generator 17b.

Figure 2:
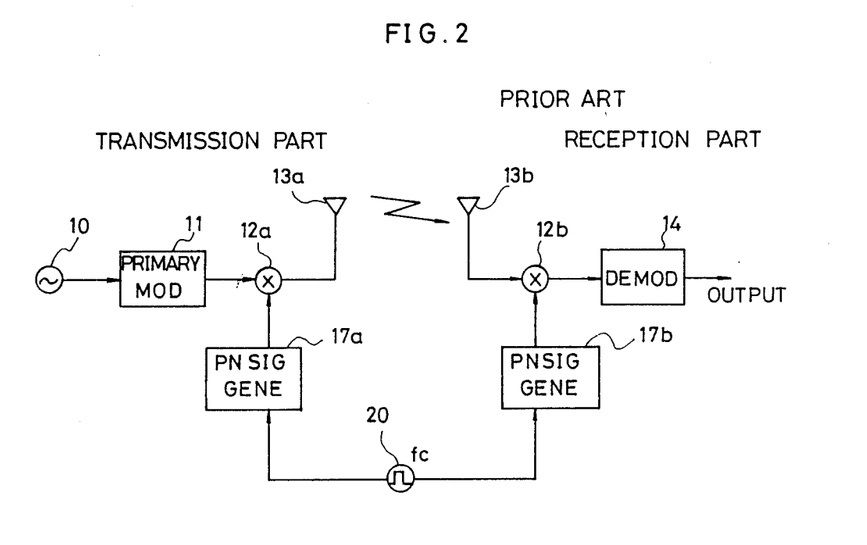
FIG. 2 is a block diagram of another example of conventional spread spectrum communication systems.

FIG. 2 shows another system configuration of the conventional spread spectrum communication system. In FIG. 2, constituents identical to those in FIG. 1 are denoted by reference numerals identical to those therein. A clock signal generator 20 generates a clock signal of a frequency fc, which is supplied to the PN signal generator 17a in the transmission part and the PN signal generator 17b in the reception part.

Figure 3:
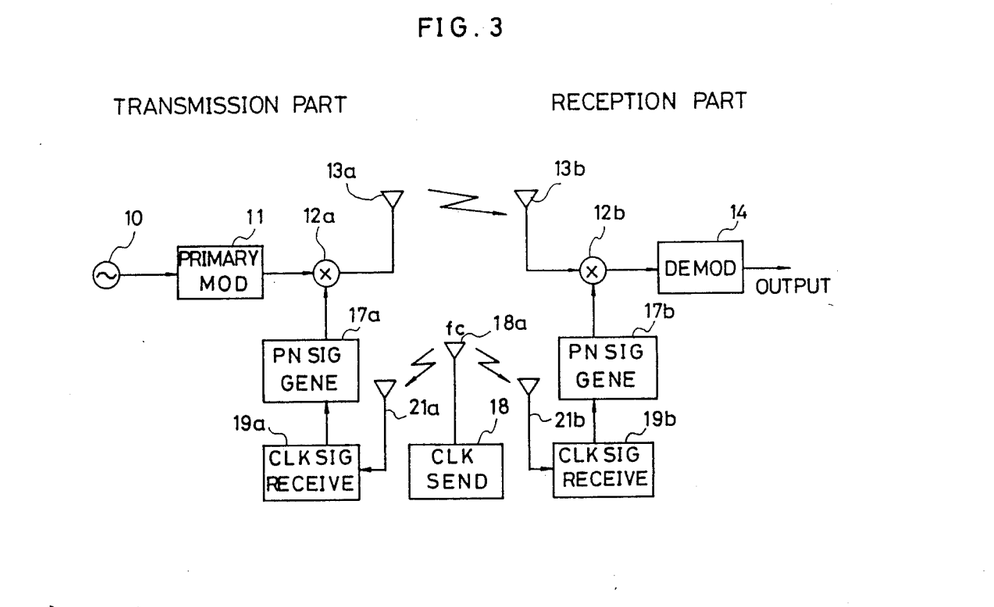
FIG. 3 is a block diagram of a conceivable spread spectrum communication system.

FIG. 3 shows a conceivable system configuration for the spectrum communication system. In FIG. 3, the same constituents as those in the previous figures are denoted by the same reference numerals as those therein. An exclusive clock signal transmitter 18 sends a clock signal through an antenna 18a. The sent clock signal is received by a clock signal receiver 19a in the transmission part through an antenna 21a, and is also received by a clock signal receiver 19b through an antenna 21b in the reception part. The clock signal receivers 19a and 19b supply the clock signals identical to each other to the PN signal generators 17a and 17b, respectively.

However, the system of FIG. 1 has a disadvantage that it is difficult to extract the clock signal from the spread signal in the reception part. The sytem of FIG. 2 has a disadvantage that transmission lines to be laid out on the ground are needed for supplying the clock signals to the transmission and reception parts, and therefore various limitations due to the use of the transmission lines exist. The system of FIG. 3 is impractical because it is necessary to install the exclusive clock signal transmitter 18 specifically designed for sending the clock signal which requires an exclusive transmission frequency to be added in the frequency spectrum, and the clock signal receivers 19a and 19b for receiving the clock signal from the clock signal transmitter 18.

SUMMARY OF THE INVENTION

Accordingly, a general object of the present invention is to provide a novel and useful spread spectrum communication system in which the above disadvantages have been eliminated.

A more specific object of the present invention is to provide a spread spectrum communication system of a simpler and more economic configuration.

The above objects of the present invention are achieved by a spread spectrum communication system comprising the following transmission part (transmitter) and reception part (receiver). The transmission part comprises a first circuit for extracting a first carrier signal from a predetermined broadcast wave and generating a first clock signal by using the first carrier signal; a second circuit for generating a first pseudo-noise signal by using the first clock signal from the first circuit; and a third circuit for modulating an information signal and broadening a frequency range of the modulated information signal from the first pseudo-noise signal from the second circuit. The reception part comprises a fourth circuit for extracting a second carrier signal from the predetermined broadcast wave and generating a second clock signal from the second carrier signal, a frequency of the second carrier signal being identical to that of the first carrier signal, and thereby the second clock signal becoming identical to the first clock signal in frequency; a fifth circuit for generating a second pseudo-noise signal from the second clock signal supplied from the fourth circuit, a pattern of the second pseudo-noise signal being identical to that of the first pseudo-noise signal; and a sixth circuit for subjecting the received information signal from the transmission part to despread by the second pseudo-noise signal and demodulating the despread information signal to generate the original information signal.

Another object of the present invention is to provide a spread spectrum communication system in which secrecy of information can be ensured even when the carrier signal used for generating the PN signal is extracted from the broadcast signal.

This another object of the present invention is achieved by a spread spectrum communication system comprising the following transmission part (transmitter)

and reception part (receiver). The transmission part comprises a first circuit for extracting a plurality of first carrier signals from predetermined broadcast waves; a second circuuit for combining the plurality of the first carrier signals into each other; a third circuit for producing a first clock signal of a predetermined frequency from the combined first carrier signals; a fourth circuit for generating a first pseudo-noise signal by using the first signal component; a fifth circuit for modulating an information signal and broadening a frequency range of the modulated information signal from the first pseudo-noise signal from the fourth means. The reception part comprises a sixth circuit for extracting a plurality of second carrier signals from said predetermined broadcast waves, frequencies of the plurality of the second carrier signals being respectively identical to the plurality of the first carrier signals; a seventh circuit for combining the plurality of the second carrier signals with each other; an eighth circuit for producing a second clock signal of said predetermined frequency from the combined second carrier signals; a ninth circuit for generating a second pseudo-noise signal from the second clock signal supplied from the eighth circuit, a pattern of the second pseudo-noise signal being identical to that of the first pseudo-noise signal; and a tenth circuit for subjecting the received information signal from the transmission part to a despread and demodulating the despread information signal by using the second pseudo-noise signal to produce the information signal in an original form.

Other objects, features and advantages of the present invention will become apparent from the following description when read in conjunction with the accompanying drawings.

DETAILED DESCRIPTION OF PREFERRED EMBODIMENTS

As described before, in spread spectrum communication systems, PN signals which have the same pattern and are synchronized with each other are necessary to broaden the band of an information signal which is to be sent by spreading the same in the transmission part of the system, and to demodulate the broadened signal to the original information signal by despreading the broadened signal in the reception part. In order to generate the PN signals, clock signals which are synchronized with each other are necessary between the transmission and reception parts.

According to the present invention, the clock signal is generated from a carrier signal of a braodcast wave of a television station, radio station or the like serving the area in which both the transmission and reception parts are located. With this system configuration, the clock signal generators and the like become unnecessary. Additionally, a carrier frequency of the television station, radio station or the like is highly stable even in a high frequency range and is extremely powerful. Therefore, it becomes possible to easily derive a clock signal from the broadcast wave and a possible service area of the system can be extensive.

Figure 4:
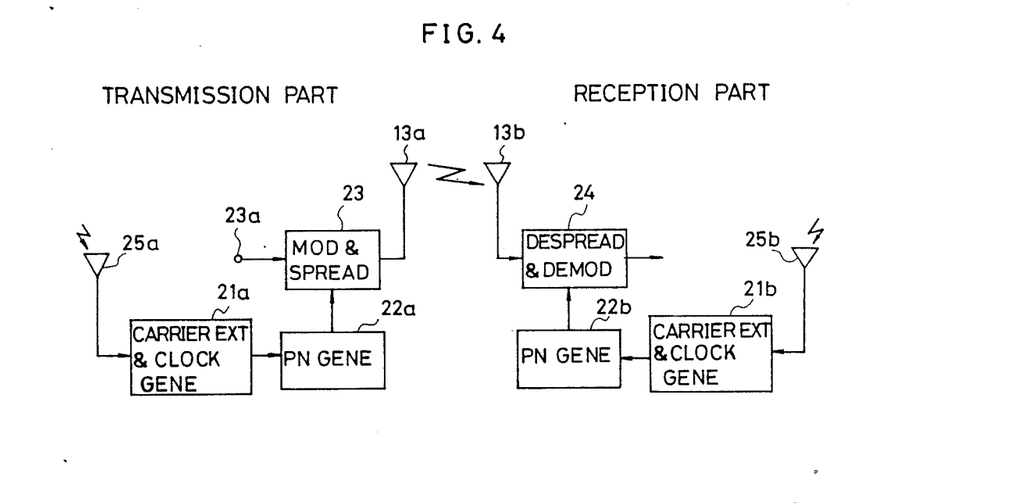
FIG. 4 is a block diagram for explaining the principle of the present invention.

Referring to FIG. 4, a circuit 21a in a transmission part receives a broadcast wave through an antenna 25a, and extracts a carrier signal from the received broadcast wave. Subsequently, the circuit 21a generates a clock signal by using the extracted carrier signal. The clock signal is supplied to a first PN signal generator 22a, which generates a PN signal from the clock signal. The PN signal is supplied to a modulation and spread circuit 23, which modulates an information signal to be supplied to a terminal 23a and transmitted, and the PN signal spreads the modulated information signal by using the PN signal from the PN signal generator 22a. The output signal of the modulation and spread circuit 23 is fed to an antenna 13a.

A despread and demodulation circuit 24 receives the transmission signal from the transmission part through an antenna 13a. On the other hand, a second circuit 21b receives, through an antenna 25b, the broadcast wave which is the same as the broadcast signal received by the transmission part. Then, the second circuit 21b extracts a carrier signal from the received broadcast wave and generates a clock signal which is the same as the clock signal generated by the circuit 21a in the transmission part 21a. The generated clock signal is supplied to a second PN signal generator 22b, which generates a PN signal which is the same as the PN signal generated by the first PN signal generator 22a in the transmission part. The clock signal generated by the second PN signal generator 22b is supplied to the despread and demodulation circuit 24, which carries out the despread for the received signal. Then, the circuit 24 demodulates the despread signal to output the original information signal.

Figure 5:
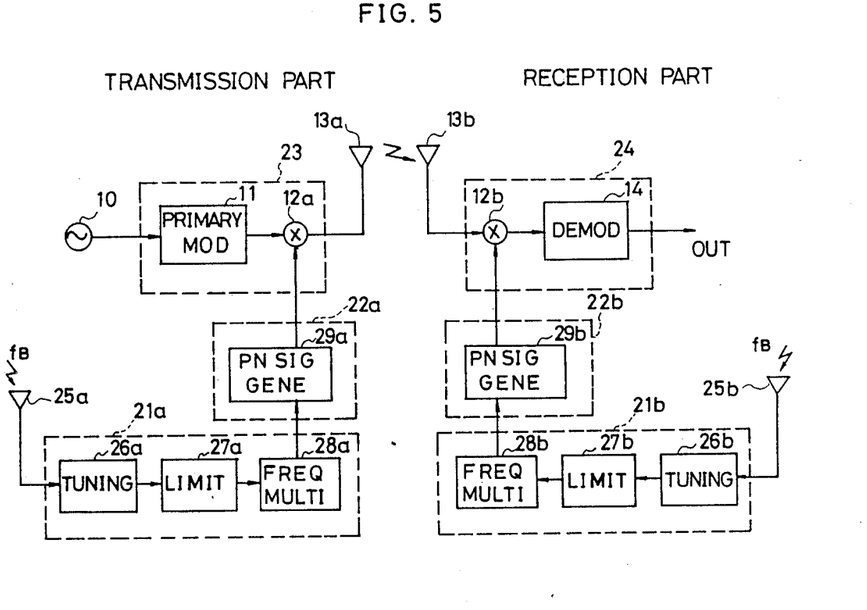
FIG. 5 is a block diagram of a preferred embodiment of the present invention.

Referring to FIG. 5 showing a detailed configuration of the embodiment of the present invention, an illustrated system has a feature that a carrier signal is extracted from an amplitude-modulated broadcast wave (hereafter simply referred to as an AM broadcast signal) in each of the transmission and reception part, and a clock signal is generated from the extracted carrier signal.

Figure 6A:
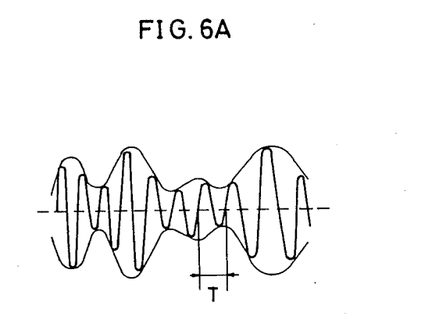
FIGS. 6A and 6B are views of signal waveforms for explaining the extraction of a clock signal from an amplitude-modulated signal.
Figure 6B:
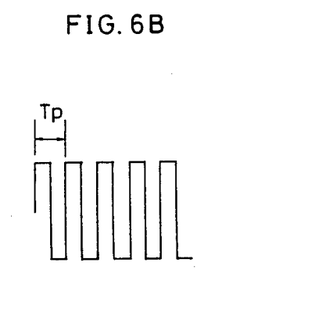

In the transmission part, the modulation and spread circuit 23 comprises the primary modulator 11 and the multiplier 12a. The circuit 21a comprises a tuning circuit 26a, a limiter 27a and a frequency multiplier 28a. The first PN signal generator 22a comprises a PN signal generator 29a. The antenna 25a is connected to an input terminal of the tuning circuit 26a for selecting a desired amplitude-modulated broadcast wave as shown in FIG. 6A. In FIG. 6A, the AM broadcast wave has a period T. An output terminal of the tuning circuit 26a is connected to an input terminal of the limiter 27a which outputs a corresponding rectangular signal from the selected AM broadcast wave. The outputted rectangular wave related to the selected AM broadcast wave of FIG. 6A is shown in FIG. 6B. The outputted rectangular wave having a pulse spacing Tp may be used as the clock signal as it is. However, in the present embodiment, a clock signal having a frequency of N times higher than the rectangular wave is generated by the frequency multiplier 28a in order to enhance secrecy of communications. The clock signal derived from the frequency multiplier 28a is supplied to the PN signal generator 29a. A frequency divider may be used in place of the frequency multipliers 28a and 28b.

The second circuit 21b in the reception part has the same structure as the first circuit 21a in the transmission part. That is, the second circuit 21b comprises a tuning circuit 26b, a limiter 27b and a frequency multiplier 28b. The tuning circuit 26b selects an AM broadcast wave which is the same as the AM broadcast wave selected by the tuning circuit 26a in the transmission part. The limiter 27b generates a rectangular carrier signal which is the same as the rectangular signal outputted by the limiter 27a. The frequency multiplier 28b generates a clock signal having a frequency of N times higher than the rectangular wave from the limiter 27b. The clock signal from the frequency multiplier 28b is the same as the clock signal from the frequency multiplier 28a. The clock signal from the frequency multiplier 28b is supplied to the PN signal generator 29b.

The PN signal generates 29a and 29b generate pulse trains of pseudo-noise which are the same as each other by using the clock signals from the frequency multipliers 28a and 28b, respectively.

The primary modulator 11 in the transmission part subjects the information signal derived from the signal source 10 to a desired modulation such as the frequency modulation (FM), frequency shift keying (hereafter simply referred to as FSK), and modified frequency modulation (MFM). The multiplier 12a multiplies the modulated information signal and the PN signal generated by the PN signal generator 29a, and transmits a band-broadened signal, that is, a spread signal through the antenna 13a.

In the reception part, the above transmitted signal is received through the antenna 13b and is applied to one of the inputs of the multiplier 12b of the despread and demodulation circuit 24. The multiplier 12b multiplies the received signal and the PN signal derived from the PN signal generator 29b so as to subject the received signal to the despread, and supplies the modulated signal to the demodulator 14. As described before, the PN signal generated by the PN signal generator 29b has the same pattern as and is in synchronization with the PN signal generated by the PN signal generator 29a. The demodulator 14 demodulates the output signal of the multiplier 12b and outputs the original information signal which is the same of the information signal derived from the signal source 10 in the transmission part.

As is well known, the carrier frequency of the AM broadcast wave is highly stable in the radio frequency band and is a high power. Additionally, the carrier frequency can be easily detected from the AM broadcast wave by using currently available integrated circuits (IC-chips). Therefore, the present embodiment is a simple and economic spread spectrum communication system because of the above advantages of the AM broadcast wave.

Since the above embodiment utilizes public broadcast waves, the level of secrecy for the communication is not very high, compared to conventional systems using specific clock signals. However, it is possible to achieve a desired secrecy for the communication by employing a structure as shown in FIG. 7.

Figure 7:
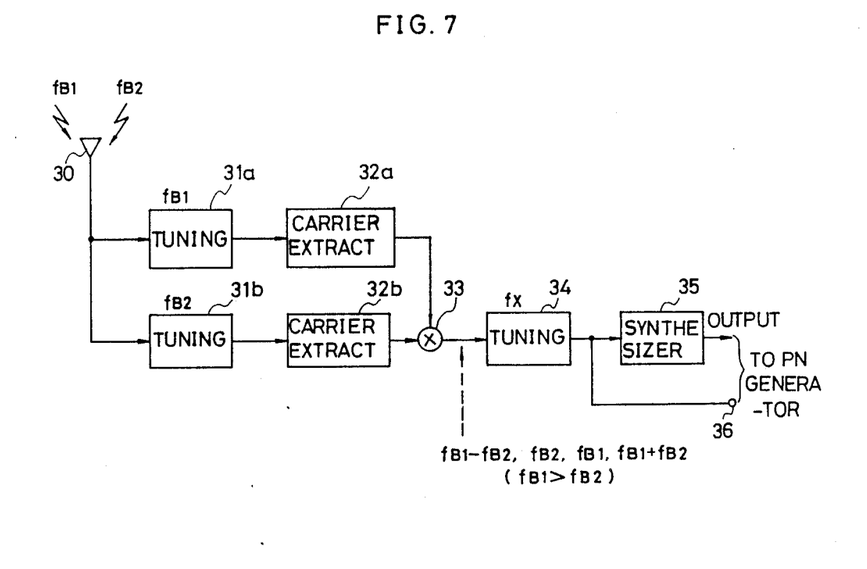
FIG. 7 is a block diagram of another embodiment of the present invention.

Referring to FIG. 7, broadcast waves of frequencies $f_{B1}$ and $f_{B2}$ from two stations are supplied to tuning circuits 31a and 31b through an antenna 30. The tuning circuits 31a and 31b select the broadcast waves of frequencies $f_{B1}$ and $f_{B2}$, respectively. A carrier signal extracting circuit 32a extracts a carrier signal from the broadcast wave of the frequency $f_{B1}$, and a carrier signal extracting circuit 32b extracts a carrier signal from the broadcast signal of the frequency $f_{B2}$. The multiplier 33 multiplies the carrier signal of the frequency $f_{B1}$ from the carrier extracting circuit 32a and the carrier signal of the frequency $f_{B2}$ from the carrier extracting circuit 32b. At the output terminal of the multiplier 33, signals having frequencies $f_{B1}-f_{B2}$, $f_{B2}$, $f_{B1}$, and $f_{B1}+f_{B2}$ are available. A tuning circuit 34 selects a signal of a frequency $f_x$ equal to $f_{B1}-f_{B2}$ or $f_{B1}+f_{B2}$ from amont the input signals applied thereto. The selected signal $f_s$ may be used as the clock signal and may be supplied to the PN signal generator through an output terminal 36. Instead of supplying the clock signal directly to the PN signal generator, the output signal of the frequency $f_s$ is supplied to a synthesizer 35, which generates a clock signal of a desired frequency by using the output signal of the tuning circuit 34. Then, the output signal of the synthesizer 35 is fed to the PN signal generator. The use of the synthesizer 35 can enhance secrecy of information.

Figure 8:
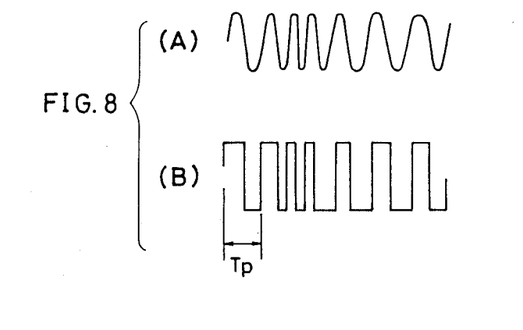
FIGS. 8A and 8B are views of signal waveforms for explaining the extraction of a clock signal from a frequency-modulated signal.

In the above embodiments, the clock signal is generated from the carried having the constant frequency. Alternatively, the present invention may use a carrier signal as shown in FIG. 8(B) which is extracted from a FM broadcast wave shown in FIG. 8(A) by using a limiter. The frequency of the carrier signal of the FM broadcast signal varies as a function of time. The transmission and reception parts receive the FM broadcast waves of the same channel at the same time, and extract the carrier signals from the received FM broadcast waves. Therefore, the PN signals generated by using the extracted carrier signals in the transmission and reception parts have the same pattern and are synchronized with each other. The system utilizing the FM broadcast wave can improve secrecy of information, compared to the system utilizing the AM broadcast wave.

The present invention may use carrier signals of FM stereo signals and television audio multiplexed signals as the clock signal. In particular, AM broadcast waves and standard waves by the National Bureau of Standards (WWV, WWVH) can provide a wider broadcasting service range in the order of 100 kilometers to several thousands of kilometers. For this reason, the clock signal can be obtained with more certainty.

Figure 9:
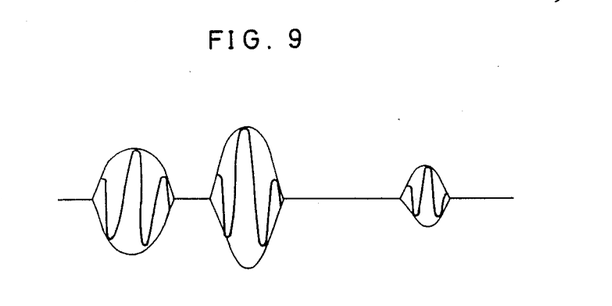
FIG. 9 shows a waveform of the amplitude-modulated broadcast wave which is over-modulated.

In the case where the AM broadcast wave is employed, it is preferable to form the tuning circuits 26a, 26b by a phase locked loop (hereafter simply referred to as PLL) or a voltage controlled crystal oscillator (hereafter simply referred to as VCXO) in order to cope with the broadcast wave of a possible overmodulation as shown in FIG. 9. As shown, the broadcast signal temporarily becomes intermittent when the signal component of the broadcast wave exceeds a 100% modulation factor, so that the carrier signal is obtained in the form of a burst signal. The PLL and VCXO can generate a continuous signal from the burst signal. For example, the PLL or VCXO is used for forming a chrominance synchronization circuit in television receivers. The chrominance synchronization circuit in conformity with the NTSC standard system can generate a continuous carrier signal used for the chrominance demodulation from the burst synchronization signal of a frequency of 3.58 MHz.

Figure 10A:
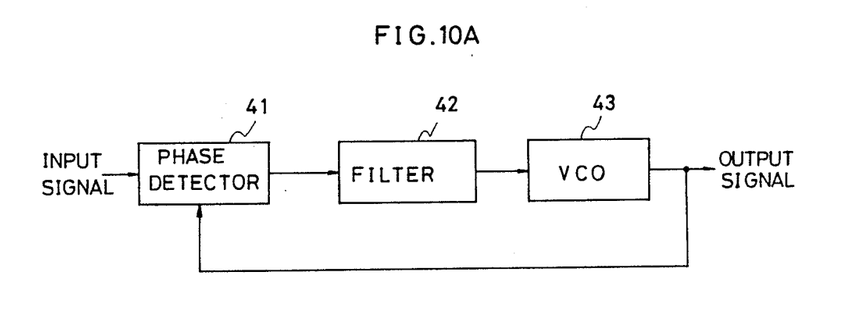
FIG. 10A is a current diagram of a phase locked loop.

FIG. 10A is a circuit diagram of a PLL which may be used for each of the tuning circuits 26a and 26b. As shown, the PLL is composed of a phase detector 41, a filter 42 and a voltage controlled oscillator (hereafter simply referred to as VCO) 43. The phase detector 41 detects the phase difference between an input signal thereof and an output signal of the VCO 43 and supplies an error voltage corresponding to the detected phase difference to the filter 42. The filter 42 smoothes the waveform of the voltage and outputs the smoothed voltage to the VCO 43. The VCO 43 adjusts the oscillation frequency in accordance with the inputted error voltage.

Figure 10B:
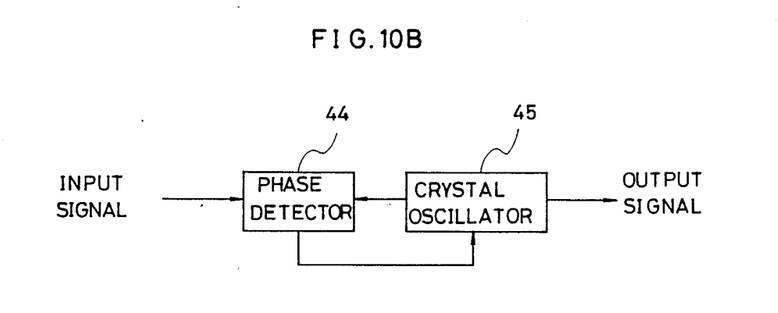
FIG. 10B is a circuit diagram of a voltage controlled crystal oscillator.

FIG. 10B is a circuit diagram of a VCXO circuit which may be used for each of the tuning circuits 26a and 26b. The VCXO is composed of a phase detector 44 and a crystal oscillator 45. The phase detector 44 detects the phase difference between an input signal thereof and an output signal of the crystal oscillator 45, and supplies an error voltage corresponding to the detected phase difference to the crystal oscillator 45. The crystal oscillator 45 is designed so as to oscillate at the frequency equal to the input signal. This oscillation is continued in response to the applied burst input signal.

Instead of forming each of the tuning circuits 26a and 26b, the frequency multipliers 28a and 28b shown in FIG. 5 may be formed with the PLL or VCXO. Further the tuning circuits 31a and 31b may be formed by the PLL or VCXO.

The present invention is not limited to the above embodiments, but various variations and modifications may be made without departing form the scope of the present invention.

What is claimed is:

1. A spread spectrum communication system comprising a pair of a transmission part and a reception part; the transmission part of the pair comprising;
    first means for extracting a first carrier signal from a predetermined broadcast wave of an existing broadcast system and generating a first clock signal by using said first carrier signal as a frequency reference;
    second means for generating a first pseudo-noise signal from said first clock signal from the first means; and
    third means for modulating an information signal to be sent and broadening a frequency range of the modulated information signal from the first pseudo-noise signal the second means; and
the reception part of the pair comprising;
    fourth means for extracting a second carrier signal from said predetermined broadcast wave and generating a second clock signal from said second carrier signal, a frequency of the second carrier signal being identical to that of the first carrier signal, thereby the second clock signal becoming identical to the first clock signal in frequency;
    fifth means for generating a second pseudo-noise signal from said second clock signal supplied from the fourth means, a pattern of the second pseudo-noise signal being identical to that of the first pseudo-noise signal; and
    sixth means for subjecting the received information signal from the transmission part to despread by the second pseudo-noise signal and demodulating the despread information signal to generate the original information signal.

2. A spread spectrum communication system as claimed in claim 1, wherein the first means comprises a tuning circuit tuned to a carrier frequency of the predetermined broadcast wave, a limiter for outputting the first carrier signal, and a frequency converter for converting the frequency of the first carrier signal to a predetermined frequency, so that the frequency-converted first carrier signal is supplied to the second means as the first clock signal.

3. A spread spectrum communication system as claimed in claim 1, wherein the fourth means comprises a tuning circuit tuned to a carrier frequency of the predetermined broad cast wave, a limiter for outputting the second carrier signal, and a frequency converter for converting the frequency of the second carrier signal to a predetermined frequency, so that the frequency-converted second carrier signal is supplied to the fifth means as the second clock signal which is the same as the first clock signal.

4. A spread spectrum communication system as claimed in claim 1, wherein the predetermined broadcast wave is an amplitude-modulated broadcast wave.

5. A spread spectrum communication system as claimed in claim 1, wherein the predetermined broadcast wave is a frequency-modulated broadcast wave.

6. A spread spectrum communication system as claimed in claim 2, wherein the frequency converter is one of a frequency multiplier and a frequency divider.

7. A spread spectrum communication system as claimed in claim 3, wherein the frequency converter is one of a frequency multiplier and a frequency divider.

8. A spread spectrum communication system as claimed in claim 1, wherein each of the first and fourth means comprises one of a phase looked loop and a voltage controlled crystal oscillator.

9. A spread spectrum communication system as claimed in claim 1, wherein the second clock signal has a phase synchronized with a phase of the first clock signal.

10. A spread spectrum communication system comprising a pair of a transmission part and a reception part; the transmission part of the pair comprising;
    first means for extracting a plurality of first carrier signals from predetermined broadcast waves of existing broadcast systems;
    second means for combining said plurality of the first carrier signals into each other;
    third means for producing a first clock signal of a predetermined frequency from the combined first carrier signals using the combined first carrier signals as frequency references;
    fourth means for generating a first psuedo-noise signal responsive to said first clock signal; and
    fifth means for modulating an information signal and broadening a frequency range of the modulated information signal responsive to the first pseudo-noise signal supplied from the fourth means; and
the reception part of the pair comprising;

sixth means for extracting a plurality of second carrier signals from said predetermined broadcast waves, frequencies of the plurality of the second carrier signals being respectively identical to the plurality of the first carrier signals;

seventh means for combining said plurality of the second carrier signals with each other;

eighth means for producing a second clock signal of said predetermined frequency from the combined second carrier signals using the combined second carrier signals as frequency references;

ninth means for generating a second pseudo-noise signal from said second clock signal supplied from the eighth means, a pattern of the second pseudo-noise signal being identical to that of the first pseudo-noise signal; and tenth means for subjecting the received information signal from the transmission part to despread and demodulating the despread information signal by using the second pseudo-noise signal to reproduce the information signal in an original form.

11. A spread spectrum communication system as claimed in claim 10, wherein each of the third and eighth means produces the clock signal having the frequency corresponding to a sum of frequencies of the plurality of the broadcast waves.

12. A spread spectrum communication system as claimed in claim 10, wherein each of the third and eighth means produces the clock signal having the frequency corresponding to a subtraction between frequencies of the plurality of the broadcast waves.

13. A spread spectrum communication system as claimed in claim 10, wherein each of the transmission and reception parts further comprises signal generating means for generating a clock signal having a frequency different from the frequency of each of the first and second clock signal applied thereto, and wherein the generated clock signals in the transmission and reception parts are supplied to the fourth and ninth means for generating the pseudo-noise signal.

14. A spread spectrum communication system as claimed in claim 13, wherein the signal generating means is formed by a synthesizer.

15. A spread spectrum communication system as claimed in claim 10, wherein the plurality of the predetermined broadcast waves are amplitude-modulated broadcast waves.

16. A spread spectrum communication system as claimed in claim 10, wherein the plurality of the predetermined broadcast waves are frequency-modulated broadcast waves.

17. A spread spectrum communication system as claimed in claim 10, wherein each of the first and sixth means comprises one of a phase looked loop and a voltage controlled crystal oscillator.

18. A spread spectrum communication system as claimed in claim 10, wherein the second clock signal has a phase synchronized with a phase of the first clock signal.

19. A transmitter in use for a spread spectrum communication system comprising;

first means for extracting a carrier signal from a predetermined broadcast wave of an existing broadcast system and generating a clock signal responsive to the carrier signal as a frequency reference;

second means for generating a pseudo-noise signal responsive to said clock signal from the first means;

third means for modulating an information signal to be transmitted and supplied thereto and broadening a frequency range of the modulated information signal responsive to the pseudo-noise signal from the second means.

20. A transmitter in use for a spread spectrum communication system as claimed in claim 19, wherein the first means comprises a tuning circuit tuned to a carrier frequency of the predetermined broadcast wave, a limiter for outputting the carrier signal, and a frequency converter for converting the frequency of the carrier signal to a predetermined frequency, so that the frequency-converted carrier signal is supplied to the second means as the clock signal.

21. A receiver of a spread spectrum communication system for receiving an information signal from a corresponding transmitter comprising;

first means for extracting a carrier signal from a predetermined broadcast wave of an existing broadcast signal and generating a clock signal from the carrier signal as a frequency reference, a frequency of the carrier signal being identical to that of a carrier signal used in the corresponding transmitter, thereby the clock signal in said receiver becoming identical to a clock signal in frequency used in the corresponding transmittor;

second means for generating a pseudo-noise signal from said clock signal supplied from the first means, a frequency of the pseudo-noise signal being identical to that of a pseudo-noise signal used in the transmitter and third means for subjecting the information signal sent from the corresponding transmitter to despread by the pseudo-noise signal and demodulating the despread information signal to reproduce the information signal in an original form.

22. A receiver in use for a spread spectrum communication system as claimed in claim 21, wherein the first means comprises a tuning circuit tuned to a carrier frequency of the predetermined broad cast wave, a limiter for outputting the carrier signal, and a frequency converter for converting the frequency of the carrier signal to a predetermined frequency, so that the frequency-converted carrier signal is supplied to the second means as the clock signal which is the same as a clock signal used in the corresponding transmitter.

23. A transmitter in use for a spread spectrum communication system comprising;

first means for extracting a plurality of carrier signals from predetermined broadcast waves of existing broadcast systems;

second means for combining said plurality of the carrier signals into each other;

third means for producing a clock signal of a predetermined frequency from the combined carrier signals using the combined first carrier signals as frequency references;

fourth means for generating a pseudo-noise signal responsive to said clock signal; and fifth means for modulating an information signal and broadening a frequency range of the modulated information signal responsive to the pseudo-noise signal supplied from the fourth means.

24. A transmitter in use for a spread spectrum communication system as claimed in claim 23, wherein the third means produces the clock signal having the frequency corresponding to one of a sum of the frequencies of the plurality of the broadcast waves and a difference therebetween.

25. A transmitter in use for a spread spectrum communication system as claimed in claim 23, wherein the transmitter further comprises signal generating means for generating a clock signal having a frequency different from the frequency of the clock signal supplied thereto, and wherein the generated clock signal is supplied to the fourth means for generating the pseudo-noise signal.

26. A receiver of a spread spectrum communication system for receiving an information signal from a corresponding transmitter comprising;

first means for extracting a plurality of carrier signals from predetermined broadcast waves of existing broadcast systems, frequencies, of the plurality of the carrier signals being respectively identical to a plurality of carrier signals used in a corresponding transmitter;

second means for combining the plurality of the carrier signals with each other to generate a combined carrier signal;

third means for producing a clock signal of a predetermined frequency from the combined carrier signals using the combined carrier signals as frequency references;

fourth means for generating a pseudo-noise signal from said clock signal supplied from the third means, a frequency of the pseudo-noise signal being identical to that of a pseudo-noise signal used in the corresponding transmitter, and fifth means for subjecting the information signal sent from the corresponding transmitter to despread by the second pseudo-noise signal and demodulating the despread information signal to reproduce the information signal in an original form.

27. A receiver in use for a spread spectrum communication system as claimed in claim 26, wherein the third means produces the clock signal having the frequency corresponnding to one of a sum of the frequencies of the plurality of the broadcast waves and a difference therebetween.

28. A receiver in use for a spread spectrum communication system as claimed in claim 27, wherein the receiver further comprises signal generating means for generating a clock signal having a frequency different from the frequency of the clock signal supplied thereto, and wherein the generated clock signal is supplied to the fourth means for generating the pseudo-noise signal.

* * * * *